United States Patent

[11] 3,583,665

| | | |
|---|---|---|
| [72] | Inventor | Thomas E. Lohr<br>Warren, Mich. |
| [21] | Appl. No. | 829,879 |
| [22] | Filed | June 3, 1969 |
| [45] | Patented | June 8, 1971 |
| [73] | Assignee | Allied Chemical Corporation<br>New York, N.Y. |

[54] VEHICLE SEAT ADJUSTING MECHANISM
13 Claims, 7 Drawing Figs.

[52] U.S. Cl. ................................................ 248/395, 297/346
[51] Int. Cl. ................................................ B60m 1/08
[50] Field of Search .................................... 248/396, 393, 395, 419, 421, 423, 424; 297/340, 341, 344, 345, 346, 316, 317, 322, 329

[56] References Cited
UNITED STATES PATENTS

| 694,990 | 3/1902 | Reed | 248/424 |
|---|---|---|---|
| 1,860,612 | 5/1932 | Emond | 297/329 |
| 1,988,638 | 1/1935 | Van Deest | 297/344 |
| 2,795,265 | 6/1957 | Albrecht | 297/341 |
| 3,008,681 | 11/1961 | Matthews | 248/395 |
| 3,170,728 | 2/1965 | Barenyi | 297/344 |

FOREIGN PATENTS

| 630,052 | 10/1949 | Great Britain | 248/393 |
|---|---|---|---|
| 379,191 | 9/1907 | France | 297/344 |

*Primary Examiner*—Marion Parsons, Jr
*Attorney*—Hauke, Krass, Gifford and Patalidis

ABSTRACT: A vehicle seat supporting mechanism which serves as the means for adjusting a one-piece seat structure forwardly and rearwardly to accommodate different drivers and passengers and also as a means for pivoting the seat forwardly to permit access to the rear seat of the vehicle. The front of the seat is supported on a pair of spaced pivotal links and the rear portion is supported on a rod movable within a curvilinear slot so that upon movement of the seat the front end of the seat will be advanced forwardly and downwardly by the pair of links and the rear end will be advanced forwardly and upwardly by movement of the rod within the slot. The rear portion of the slot is relatively straight and a manually operable lock and release mechanism provides a means for locking the seat in a selected adjusted portion. A latch mechanism releases the lock mechanism and permits the seat to be moved forwardly of the straight portion of the slot to permit the seat to be tipped for access to the rear section of the vehicle.

INVENTOR
THOMAS E. LOHR

VEHICLE SEAT ADJUSTING MECHANISM

BACKGROUND OF THE INVENTION

1. Field of the Invention

The present invention relates to vehicle seat supporting means and more particularly to mechanism for mounting a seat member having a unitary back and seat structure in a manner which permits the seat to be adjusted to a selected position and to be tilted forwardly to permit access to the rear compartment of the vehicle.

2. Description of the Prior Art

It is of course common to provide vehicle seats with adjusting mechanism to permit forwardly and rearwardly adjustment to suit any particular occupant of the seat. In two-door vehicles it is also common to provide the front seats of the vehicles with independently pivotally supported back sections which can be tilted forwardly to facilitate entrance into and egress out of the rear compartment of the vehicle.

Front seats having back sections which tilt do not provide sufficient support for an occupant during an accident unless they are provided with means for locking the back section in an upright position until access to the rear compartment is desired. Another means of solving this problem is to provide a seat having a unitary seat and back structure and mechanism which permits the entire seat to be tilted forwardly for access to the rear seat. Heretofore, however, the adjustment mechanism for this latter type of seat construction has been relatively expensive and generally unsatisfactory.

SUMMARY OF THE INVENTION

The present invention provides a combined adjustment and tilting mechanism for seats of a unitary bottom and back construction. The mechanism comprises a lower support member secured to the bottom of the seat unit. The lower support member has upright flanges provided with an elongated slot for receiving a pin or rod which is attached to an upper support member upon which the seat structure is mounted. In this way the upper support member is movable forwardly and rearwardly along the lower support member to the extent permitted by the slot. Additional support between the members is provided by links and the front portion of the slot is curved to produce a forwardly tilting motion of the seat at the forwardmost adjusted position of the seat. The upper and lower support members are further connected by a rack and locking mechanism to lock the seat in a desired adjusted position over a relatively straight portion of the slot. This mechanism is releasable by a linkage arrangement, which when held in the released position, allows the seat to be moved into the curved portion of the slot to be pivoted angularly forwardly to provide access to the rear compartment of the vehicle.

BRIEF DESCRIPTION OF THE DRAWINGS

The accompanying drawings illustrate a preferred embodiment of the present invention, in which.

DESCRIPTION OF THE PREFERRED EMBODIMENT

Figure 1:
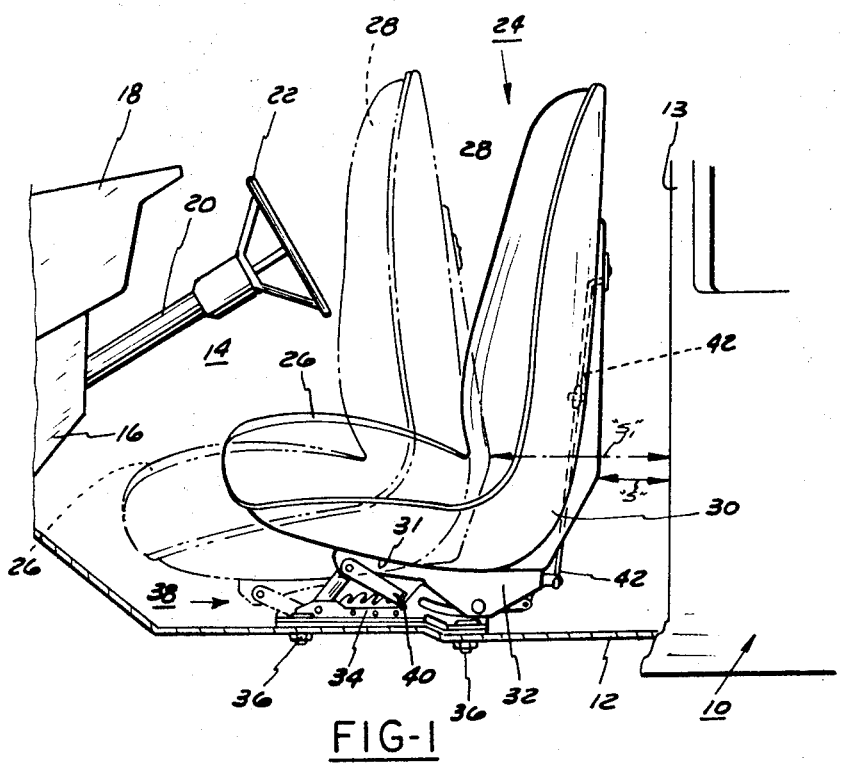
FIG. 1 is a side view illustration of the present novel seat unit shown installed in a vehicle.

With reference to FIG. 1, a vehicle body is generally indicated at 10, including a vehicle floor 12, and a driver's compartment 14, a usual firewall 16 and dashboard 18 in which is mounted in the usual manner a steering column 20 having a steering wheel 22 at its end.

The steering wheel 22 is in positional alignment with the driver's seat 24, which in the present instance is of the bucket seat type, having a seating portion 26 and a back supporting portion 28, both of which are formed as a unit and retained within a molding or stamping 30 of sheet metal or the like.

The bottom portion of the seat molding 30 is attached to a support member 32 which is pivotally and longitudinally movably secured to a lower support member 34 in a manner which will be subsequently described. The lower support member 34 is rigidly attached by means of fasteners 36 to the floor 12 of the vehicle. In assembly, the upper and lower seat support members 32 and 34 form the seat-adjusting mechanism 38, which forms the subject matter of the present invention.

As indicated in FIG. 1, the seat-adjusting mechanism 38 permits longitudinal as well as pivotal adjusting movement of the seat 24 towards or away from the steering wheel 22 as indicated by the position of the seat shown in dot and dash lines, to provide individual seat preference in relation to the steering wheel, as well as to facilitate the entrance and exit into or out of the rear compartment of the vehicle by increasing the passage space "S" between the rear of the seat and the rear door frame 13 of the vehicle.

The seat 24 is releasably retained in any desired adjusted position between a maximum rear and maximum front position by an improved lock mechanism 40. The lock mechanism 40 can be released by a lever-actuated linkage 42 extending up through the molding 30 of the back support portion 28 of the seat in a manner which will be described later.

With reference now to FIGS. 2—7, the present novel seat-adjusting mechanism 38 is illustrated in detail separate from the seat. As particularly seen in FIG. 5, the upper support member 32 comprises a stamping or the like of generally U-shaped cross section and having a curvilinear upper surface 33 corresponding to the curvilinear bottom surface 31 of the seat molding 30, and which is provided at both rear and front ends with threaded studs 44 (FIG. 5) for attachment to the seat molding 30, as shown in FIG. 1. The upper support member 32 is provided with opposite side flanges 46 and 48 extending longitudinally of the vehicle and which have a downwardly extended rear portion 50 provided with aligned apertures 52. Intermediate the extended portions 50 is disposed a U-type bracket 54 welded or otherwise secured to the underside of the upper support member having downwardly extending opposite sides 56 and 58 which are likewise provided with aligned apertures 60 in coaligned relationship with the apertures 52 in the upper support member to receive a pin or rod 62 for a purpose to appear.

Figure 3:
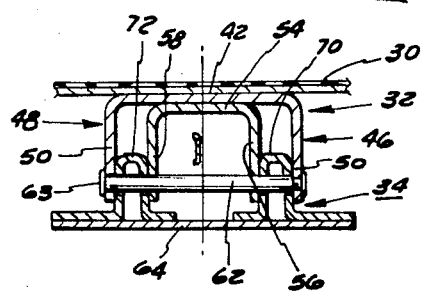
FIG. 3 is a cross section through the seat-adjusting mechanism shown in FIG. 2 as seen along line 3-3 thereof.

The lower support member 34 is comprised essentially of a bottom plate 64 for rigid attachment to the floor 12 of the vehicle by fasteners 36, as seen in FIG. 1. Secured to the plate 64 by the same fasteners 36 is a pair of opposite upstanding flange members 66 and 68 extending longitudinally of the vehicle and which, towards the rear, are formed of inverted U-channel sections 70 and 72 respectively, which, as particularly seen in FIG. 3, are of such width as to each fit closely between a side 56 and 58 of the intermediate U-bracket 54 and a respective side flange 46 or 48 of the upper support member 32 so as to laterally restrict but slidably retain the rear portion of the upper support member on the U-channel sections 70 and 72. The U-channel sections 70 and 72 of the lower support flange members 66–68 are each provided with an aligned elongated slot 74 extending in the longitudinal direction of the vehicle. The slots 74 are adapted to be aligned with the apertures 52 and 60 in the side flanges 46 and 48 and intermediate U-bracket 54 of the upper support member 32 for extension of the pin or rod 62 therethrough so as to pivotally and angularly slidably secure the rear end of the upper support member to the rear end of the lower support member.

Figure 2:
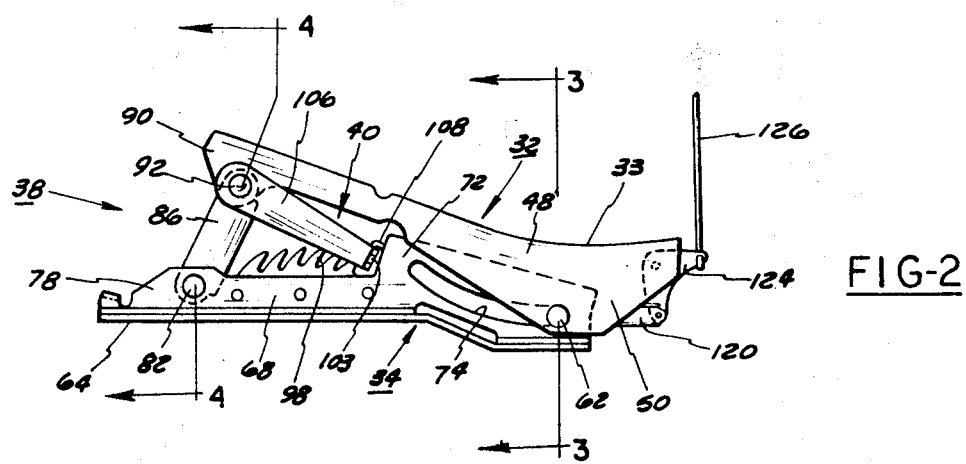
FIG. 2 is a separate side view of the seat-adjusting mechanism as embodied in the seat unit shown in FIG. 1.

As can best be seen in FIG. 2 the rearward portions of the slots are relatively straight and horizontal while the front portions curve upwardly. The pin or rod 62 has a head portion 63 at one end and may be secured in assembly at its other end by a nut, cotter pin or the like (not shown) as is best suitable to retain the pin within the apertures 52 and 60 and the slots 74.

Figure 4:
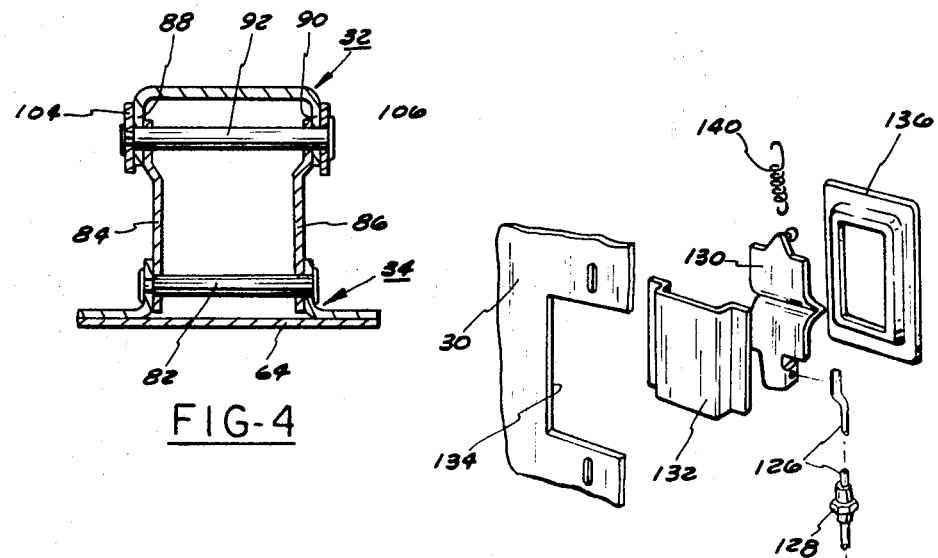
FIG. 4 is another cross section through the seat-adjusting mechanism shown in FIG. 2 as seen along line 4-4 thereof.

The opposite front ends 76 and 78 of the flange members 66–68 of the lower support 34 are provided with transversely aligned apertures 80, which are adapted to receive a pivot pin 82 for pivotal securement of a pair of identical links 84 and 86 immediately adjacent to the inside of the flanged front ends 76 and 78, as seen in FIG. 4. The other end of the pair of links 84–86 is pivotally attached to the front ends 88 and 90 of the side flanges 46 and 48 of the upper support member by means of a similar pivot pin 92 extending through aligned apertures 94 in the opposite front ends and aligned apertures 87 in the pair of links. Thus, the forward end of the upper support member 32 is pivotally secured by means of the pair of links 84, 86 in suspended relationship relative to the forward end of the lower support member.

Figure 6:
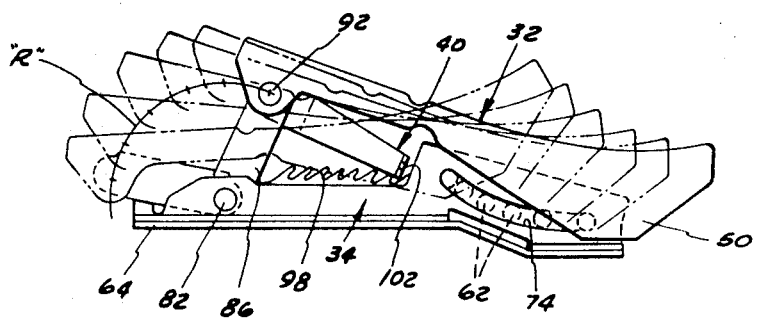
FIG. 6 is a view similar to FIG. 2 showing the seat-adjusting mechanism in its various adjusted positions.

As particularly seen in FIGS. 1 and 6, upon forward movement of the seat unit 24 (FIG. 1) the upper support member 32 which supports the seat unit is first relatively linearly moved forwardly as the pin 62 is moved through the relatively straight portions of the slots 74. When the pin reaches the forward portions of the slots 74 then the seat unit 24 is tilted forwardly. In the normal inclined position of the seat unit, indicated in solid lines in FIG. 1, the slot pin 62 is positioned in the lowermost position at the rear end of the slots 74 and the front end of the upper support is suspended upwardly by the pair of links 84–86. When the seat unit is moved forwardly as far as it will go the slot pin 62 is forced to ride upwardly along the curved portion of the slots and, since the rear end of the upper support is attached to the pin, the rear end of the seat unit will be rocked forwardly and upwardly, as indicated in FIG. 6 to the various positions shown in phantom lines. Simultaneously, the front end of the seat unit is moved forwardly and downwardly, around a fixed radius "R" described by the pair of links 84,86 with the lower pivot pin 82 as the center, as likewise indicated by the various positions shown in phantom lines in FIG. 6. Thus, with reference to FIG. 1, the seat unit 24 is movable from its maximum rearwardly upright position shown in solid lines to a maximum forwardly tilted position shown in phantom lines. In the maximum rear position of the seat unit in FIG. 1, it is seen that only a narrow space "S" is provided between the rear of the seat unit and rear door frame 13 in the maximum forward tilted position, as shown in phantom lines in FIG. 1, the space "S," as seen, is considerably increased to a distance "$S_1$" to thereby permit easy access into the rear compartment of the vehicle.

Figure 5:
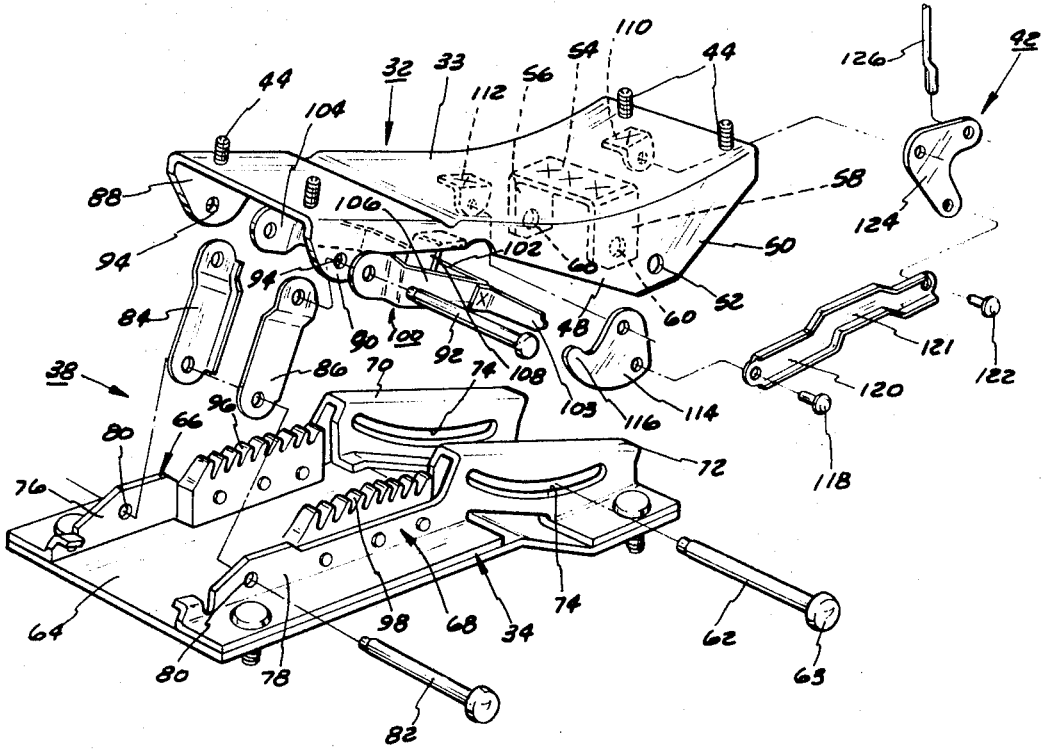
FIG. 5 is a perspective, exploded view of the seat-adjusting mechanism shown in FIG. 2 illustrating the individual parts in disassembled position.
Figure 7:
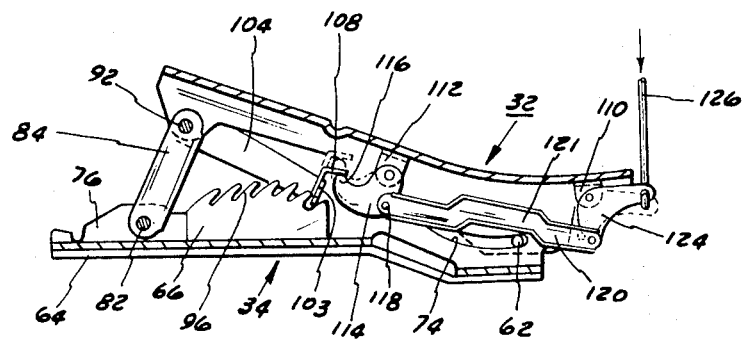
FIG. 7 is a longitudinal central cross section through the seat-adjusting mechanism shown in FIG. 2 illustrating the structure and functioning of the locking and release mechanism.

The seat unit 24 can be locked and maintained in a number of intermediate positions between maximum rear and maximum forward tilted position, as indicated in FIG. 6, which is accomplished by the lock and release mechanism 40 disposed between the upper support member 32 and lower support member 34. With particular reference to FIGS. 5 and 7, the lock mechanism 40 comprises a pair of toothed racks 96 and 98 formed integral on the lower flange members 66–68 intermediate the front ends 76–78 and the U-channel sections 70–72 and positioned in longitudinal direction of the vehicle. The teeth of the toothed racks 96–98 are adapted to be engaged at selected positions along the racks by a catch member 100 pivotally suspended from the upper support member 32. As most clearly seen in FIG. 5, the catch member 100 is comprised of a transverse bar 102 to which are attached by welding or the like a pair of arms 104–106 which other ends are apertured for pivotal support by the pivot pin 92 on the upper front ends 88–90 of the upper support member for simultaneous attachment with the pair of links 84–86. The ends of the transverse bar of the catch member extending outwardly from the pair of arms 104–106 are adapted to normally engage the teeth of the oppositely disposed toothed racks to retain the seat unit in the desired adjusted position.

The teeth 98 are disposed to permit adjustment to a selected position during the portion of relative movement of the upper and lower support members defined by the relatively straight and horizontal portions of the slots 74. Thus the seat can be adjusted to accommodate different drivers by simply lifting the catch bar 100 by means of an outwardly extending handle portion 103 moving the seat forwardly or rearwardly and then releasing the handle to permit the catch bar 100 to engage the teeth of the racks 96–98.

A rearwardly directed bracket 108 is attached to the transverse catch bar 102 intermediate the pair of arms 104–106 for a purpose to appear. A flange bracket 110 is secured to the underside of the upper support member 32 in spaced longitudinal relation rearwardly of the U-bracket 54 and a similar flange bracket 112 is secured forwardly of the U-bracket 54. The flange bracket 112 forwardly of the U-bracket 54 pivotally supports a cam member 114 which has a cam portion 116 at its forward end and which is rearwardly pivotally connected by means of a pin 118 to one end of a motion transfer link 120. The other end of the transfer link 120 is pivotally connected by means of a pin 122 to one arm of a bellcrank lever 124, which is pivotally supported on the rear flange bracket 110. It will be seen that the intermediate portion 121 of the transfer link 120 is bent upwardly to provide clearance for the slot pin 62 across which the link extends, as seen in FIG. 7. The opposite arm of the bellcrank lever 124 is connected to the end of a rod 126 which extends upwardly through the rear of the backrest portion 28 of the seat unit 24 behind the seat molding 30. The rod 126 is provided intermediate its ends with a length adjustment 128 to take up any slack in the linkage and the upper end of the rod is connected to a slide member 130 which is slidably supported within a channel member 132 secured in an appropriate aperture 134 in the rear portion of the seat molding 30. The slide member 130 is retained in the open channel member 132 by means of a frame member 136 clamped within the aperture 134 and the intermediate portion of the slide member is formed to provide a ridge portion 138 adapted to extend, in assembly, out of the frame member to provide a gripping means by which the slide member and thus the rod 126 can be moved up or down within the channel member 132. Normally, the slide member 130 is retained in an upright extended position by means of a spring 140 connected to the upper end of the slide member and a stationary part (not shown) within the backrest 28 of the seat unit.

In assembled position, as shown in FIG. 7, the cam portion 116 abuts the underside of the bracket 108 on the transverse catch bar 102 which is retained by gravity in engagement with a selected pair of teeth on the racks 96 and 98. The linkage mechanism 42 defined by the cam member 114, transfer link 120, bellcrank lever 124, rod 126 and slide member 130 is normally retained in inactive position by means of the spring 140, which urges the rod 126 upwardly and the catch member 100 is retained in locking position entirely by means of gravity, which keeps the transverse catch bar in engagement with the toothed racks 96–98. Where it is desired to release the lock, the slide member 130 is actuated by exerting a manual force on the outwardly extending ridge portion 138 of the slide member to force the slide member downwardly in the channel 132 and to thus move the rod 126 downwardly, which causes the bellcrank lever 124 to be turned by which the transfer link 120 is moved longitudinally turning the cam member 114 upwardly. By this the cam portion 116 exerts an upwardly directed force on the bracket 108 of the transverse catch bar 102 thereby forcing the catch bar out of engagement with the toothed racks 96–98 whereupon the seat unit 24 can be moved to extreme forward position to permit access to the rear compartment.

From the foregoing, it is obvious that the present invention provides an improved seat-adjusting and tilting mechanism, particularly useful for a bucket-type vehicle seat, which utilizes the same mechanism to provide adjustment as well as tilting movement of the seat as a unit. Although it has been preferred to describe this mechanism with reference to the seat to be occupied by the driver of the vehicle it is apparent that it is also intended for use with the passenger seat for vehicles.

Having thus described my invention I now claim:

1. A vehicle seat-adjusting mechanism comprising:
   a seat unit;
   an upper support member attached to said seat unit;
   a lower support member rigidly attached to the floor of said vehicle, said member including a pair of spaced upstanding flange sections, each provided with an aligned curved slot;
   means angularly slidably securing the rear end of said upper support member to said pair of flange sections of said lower support member for movement along a curved path, dictated by said curved slots, longitudinally of said vehicle so that upon adjusting movement of said seat unit said unit is caused to move tiltingly longitudinally of said vehicle; and
   a lock and release mechanism disposed between said upper and said lower support member adapted to lock said seat unit to prevent said movement.

2. In the adjusting mechanism as defined in claim 1, in which said means pivotally securing the front end of said upper support member to said lower support member comprises a pair of spaced links, each pivotally attached at one end to said side flanges of said upper support member and at the other end to said pair of upstanding flanges of said lower support member to thus angularly and linearly guide said upper support member for movement within said slots.

3. In the adjusting mechanism defined in claim 1, said lock and release mechanism comprising a pair of toothed racks disposed on said lower support member in the longitudinal direction of said vehicle and a catch member pivotally suspended from said upper support member so as to normally engage the toothed rack to prevent movement of said upper support member relative to said lower support member.

4. In the adjusting mechanism as defined in claim 1, said upper support member being comprised of a generally U-shaped cross section having an upper portion and downwardly depending side flanges, said upper portion being attached to the underside of said seat unit, said lower support member comprising a generally flat base attached to said floor of said vehicle, said pair of spaced upstanding flange sections secured to said base, said side flanges of said upper support member being adapted to extend over said pair of upstanding flanges of said lower support member closely adjacent thereto for lateral retainment of said upper support member relative to said lower support member.

5. In the adjusting mechanism defined in claim 4, a U-bracket secured to said upper support member between said side flanges having downwardly depending sides equally spaced from both of said side flanges a distance corresponding to the cross-sectional width of said upstanding flanges of said lower support member to thereby laterally retain said upper support member on said lower support member.

6. In the adjusting mechanism defined in claim 5, said sides of said U-bracket being provided with aligned apertures to permit the extension of said pin therethrough.

7. In the adjusting mechanism as defined in claim 4, a pin slidably retained in said curved slots provided on said pair of flanges of said lower support member and extending through said aligned slots to thereby angularly slidably secure said upper support member to said lower support member.

8. In the adjusting mechanism defined in claim 1, said lock and release mechanism comprising a pair of toothed racks disposed on said lower support member in longitudinal direction of said vehicle, a catch member pivotally suspended from said upper support member so as to normally engage the toothed rack to prevent movement of said upper support member relative to said lower support member, a cam member pivotally supported on said upper support member rearwardly of said catch member and normally abutting a portion of said catch member, and manual release means adapted to pivot said cam member upwardly to exert a force on said catch member to move said catch member out of engagement with said toothed racks to permit movement of said upper support member relative to said lower support member.

9. In the adjusting mechanism defined in claim 8, said manual release means being normally maintained in an active position by spring means.

10. In the adjusting mechanism as defined in claim 8, said manual release means comprising a link pivotally attached to said cam member at one end and to one end of a bellcrank lever at the other end, said bellcrank lever being pivotally secured to said upper support member and a longitudinally movable rod pivotally connected to the other arm of said bellcrank lever to enable rotation of said bellcrank lever to thereby longitudinally move said link to pivot said cam member to move said catch member out of engagement with said toothed racks.

11. In the adjusting mechanism as defined in claim 10, said longitudinally movable rod extending upwardly through the backrest portion of said seat unit and being connected to a slide member having gripping means extending outwardly of said backrest portion for actuation of said slide member to release said lock.

12. The mechanism as defined in claim 1, and in which said securing means comprises a slot formed in one of said support members and a pin received in said slot and carried by the other of said support members, said slot being disposed to extend longitudinally with respect to said vehicle and having a rearward relatively straight and horizontal portion and a forward upwardly curved portion whereby said slot guides the movement of said upper member with respect to said lower member through said pin and as said pin moves relative to said rearward portion of said slot said seat unit is maintained in a relatively horizontal position and as said pin moves relative to said forward portion of said slot said seat unit is tilted upwardly.

13. The mechanism as defined in claim 12, and including means for selectively locking said pin in a number of positions within the rearward portion of said slot.

PO-1050
(5/69)

UNITED STATES PATENT OFFICE
CERTIFICATE OF CORRECTION

Patent No. 3,583,665          Dated June 8, 1971

Inventor(s) Thomas E. Lohr

It is certified that error appears in the above-identified patent and that said Letters Patent are hereby corrected as shown below:

Column 5, insert the following between lines 17 and 18:
-- means pivotally securing the front end of said upper support member to said lower support member; --

Signed and sealed this 25th day of January 1972.

(SEAL)
Attest:

EDWARD M. FLETCHER, JR.          ROBERT GOTTSCHALK
Attesting Officer          Commissioner of Patents